Aug. 13, 1929.  R. BAUCH ET AL  1,724,390
DEVICE FOR THE SELECTIVE ISOLATION OF FAULTY ELECTRIC LINE SECTIONS
Filed Nov. 4, 1926
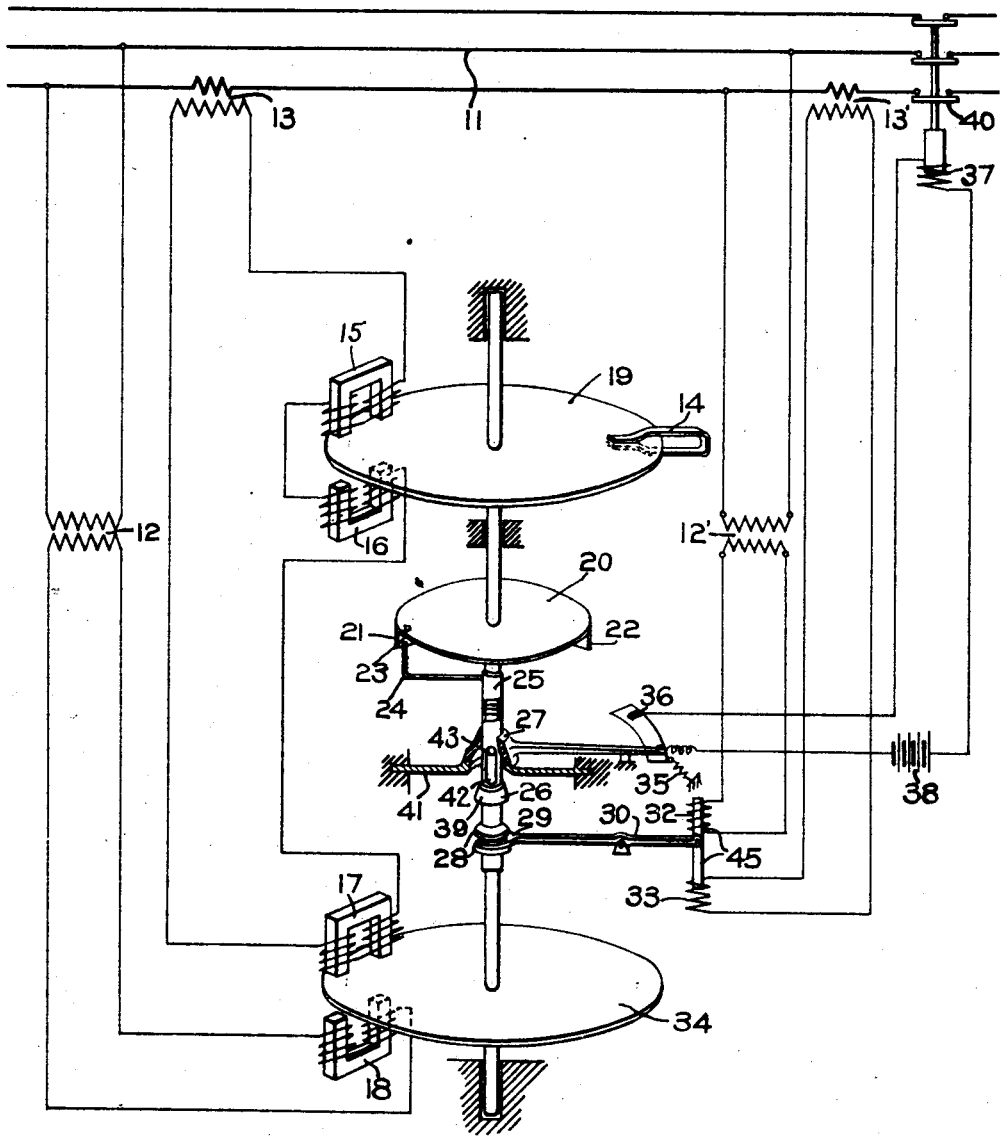
WITNESSES:
INVENTORS
Richard Bauch,
Walther Koch and
Rudolf Volzing
BY
ATTORNEY Patented Aug. 13, 1929.

1,724,390

UNITED STATES PATENT OFFICE.

RICHARD BAUCH, OF BERLIN-CHARLOTTENBURG, WALTHER KOCH, OF BERLIN, AND RUDOLF VÖLZING, OF BERLIN-SIEMENSSTADT, GERMANY, ASSIGNORS TO WESTINGHOUSE ELECTRIC AND MANUFACTURING COMPANY, A CORPORATION OF PENNSYLVANIA.

DEVICE FOR THE SELECTIVE ISOLATION OF FAULTY ELECTRIC LINE SECTIONS.

Application filed November 4, 1926, Serial No. 146,199½, and in Germany November 6, 1925.

Our invention relates to a device for the selective isolation of faulty electric-line sections.

For the selective isolation of faulty line sections, relays are already known in which two rotatable elements or members are provided: a watt element controlled by the current and the voltage in the line to be protected and a current element controlled by the current or its square value. The elements or members have been flexibly coupled together so that they are able to turn in relation to each other, and the time of operation and the response of the relay depends upon the relative displacement of the members.

Our invention relates to a relay constructed in a similar manner, and it is an object of our invention to provide a relay arrangement for controlling the operation of a circuit breaker whereby the time of operation of the relay contacts is controlled in accordance with the distance from the relay to a fault, and whereby the operation of the contacts, in response to a fault accompanied by a flow of energy in a predetermined direction. is prevented.

With this and other objects in view, we provide, in practicing our invention, two relay elements, operable in accordance with the magnitude of electrical quantities on the circuit to be protected, a contact means controlled thereby, and means controlled in response to said electrical quantities for controlling the cooperation between said relay elements and said contact means.

Referring more specifically to the drawing, the embodiment illustrated comprises two operating elements of the induction-disc type operable, respectively, in accordance with the current traversing the circuit 11, to be protected, and the product of the current and voltage of the circuit.

The upper element comprises an induction disc 19 mounted for rotation on a suitable spindle, as illustrated, and having electromagnetic elements 15 and 16 associated therewith for effecting the rotation thereof in a well-known manner. A damping magnet 14 may also be provided if desired.

A disc 20 is also mounted on the spindle of the upper element for rotation therewith and is provided, peripherally thereof, with depending portions or abutments 21 and 22 and an aperture 23, all for a purpose hereinafter described more in detail.

The lower relay element comprises an induction disc 34 mounted for rotation on a suitable spindle which is disposed, preferably, in longitudinal alignment with the aforementioned spindle of the upper element. Two operating magnets 17 and 18 control the rotation of the disc in the usual manner.

The operating electromagnets 15, 16 and 17 are energized in accordance with the current traversing the circuit 11 by means of a circuit including a suitable current transformer 13, and the electromagnet 18 is energized in accordance with the potential on the circuit 11 by means of a potential transformer 12.

It is apparent, from the foregoing, that the disc 19 is rotatable in accordance with the current traversing the circuit 11 and the disc 34 with the watts of said circuit. The upper relay is, therefore, an over-current element and the lower is a directional element.

A sleeve 25 slidably surrounds the upper end of the lower spindle and is rotatable therewith by means of a pin 42 secured to the spindle and projecting through a longitudinal slot 43 in the sleeve.

The lower end of the upper spindle is also disposed in said sleeve, and a steel ball (not shown) or other friction-reducing means may be disposed between the abutting ends of the two spindles.

An angle member, or finger, 24 is secured to the sleeve 25 for cooperation with the stops 21, 22 and aperture 23 of the disc 20, as hereinafter described.

A horizontally movable contact member is provided with an interiorly tapered collar 27 loosely surrounding the sleeve 25 and incapable of vertical movement. A correspondingly tapered collar is fixed to the sleeve so that, when the sleeve is raised, the tapered portions cooperate to cause the axial movement of the contact arm.

The contact arm is adapted to engage a fixed contact 36 to close a trip circuit including a battery 38 and a trip coil 37 of a circuit-interrupter 40 in the usual manner.

Vertical movement of sleeve 25 is controlled by a pivoted lever 30 having one end 29 thereof disposed between collars 28 on said sleeve, and having the other end 45 thereof substantially of T-shape to constitute magnetic armatures. Voltage and current windings 32 and 33 are associated with the armature portions, and are energized, respectively, in accordance with the voltage and current values of the circuit 11 by means of transformers 12' and 13'. By this arrangement, the voltage coil 32 tends to maintain the sleeve 25 in its lower position, as shown, and the current coil 33 tends to raise it.

During normal circuit conditions, the windings 32, 33 maintain the lever 30 in the position shown, and the two discs 19 and 34 freely rotate without altering the position of the contact arm. The angular member always is in contact with either the stop 21 or stop 22, depending upon the direction of rotation of the lower relay element, and hence depending upon the direction of energy flow in circuit 11.

In the event of a fault on the circuit, however, resulting in an attendant drop in voltage, the current coil 33 predominates over the coil 32, and the sleeve 25 is raised. If the angular member 24 is in the position shown, against the stop 21, vertical movement of the sleeve causes the end of the angular member to engage the hole 23 in disc 20 to thereby lock the two relay elements together. At the same time, the collar 39 engages the contact arm 27 to cause the movement thereof toward the contact 36 against the tension of the adjusting spring 35.

If, however, the direction of energy flow in circuit 11 is such that the interruption thereof is not desired, the angular member 24 will be against the stop 22, and since no aperture is provided in disc 20 at that point, the vertical movement of sleeve 25 cannot be effected.

The angular member 24 is always in engagement with one of the stops 21 or 22, depending upon whether the torque of the upper or lower relay element predominates. Since the directional, or lower, relay element is undamped, the torque thereof usually predominates, and the response of the lower element to reversals of energy, or other changes in the conditions on the circuit 11, is comparatively rapid.

In the event of a fault, the voltage element 18 of the lower relay element is energized to a substantially less degree, and the torque of the upper element predominates. Obviously, the direction of rotation of the upper element is constant irrespective of the direction of energy flow in the circuit.

Obviously, it is immaterial whether the sleeve 25 is rotated by the upper or lower element, and it is clearly within the scope of the present invention to substitute suitable gearing, or other equivalent means, for effecting the driving connection between the sleeve and contact arm 27, or this connection may be effected by electromagnetic means in an obvious manner.

Various other modifications may be made in our invention without departing from the spirit and scope thereof, and we desire, therefore, that only such limitations shall be placed thereon as are imposed by the prior art and set forth in the appended claims.

We claim as our invention:—

1. In an electrical protective device including a disc armature rotatable in accordance with the voltage and current values of a circuit to be protected, and a contact arm associated therewith, the combination with a clutch means for causing the movement of said contact arm in accordance with the rotation of said armature, and means responsive to a drop in potential on said circuit for controlling the operation of said clutch means.

2. In an electrical protective device including an armature continuously rotating in accordance with the current and potential values in a circuit to be protected, and a movable contact arm associated therewith, the combination with a clutch means for operatively connecting said armature with said contact arm to effect the movement thereof in accordance with the rotation of said armature, and means responsive to a drop in potential or an increase in the magnitude of the current traversing said circuit for causing the operation of said clutch means.

3. In an electrical protective device including a disc armature rotatable in accordance with the voltage and current values of a circuit to be protected, and a contact arm associated therewith, the combination with a clutch means for causing the movement of said contact arm in accordance with the rotation of said armature, means responsive to a drop in potential on said circuit for controlling the operation of said clutch means, and means responsive to the direction of energy flow in said circuit for controlling the operation of said controlling means.

4. In an electrical protective device including a disc armature rotatable in accordance with the voltage and current values of a circuit to be protected, and a contact arm associated therewith, the combination with a clutch means for causing the movement of said contact arm in accordance with the rotation of said armature, means responsive to a drop in potential on said circuit for controlling the operation of said clutch means, a second armature rotatable in accordance with the magnitude and direction of the current traversing said circuit and means controlled by said armature and cooperating with said clutch to control the operation of said clutch in accordance with the direction of energy in said circuit.

In testimony whereof we affix our signatures.

RICHARD BAUCH.
WALTHER KOCH.
RUDOLF VÖLZING.